Nov. 3, 1964  E. H. AHLEFELD, JR., ETAL  3,154,808
CONTINUOUS INTERNAL STIFF-GEL MIXER
Filed May 15, 1962  8 Sheets-Sheet 1
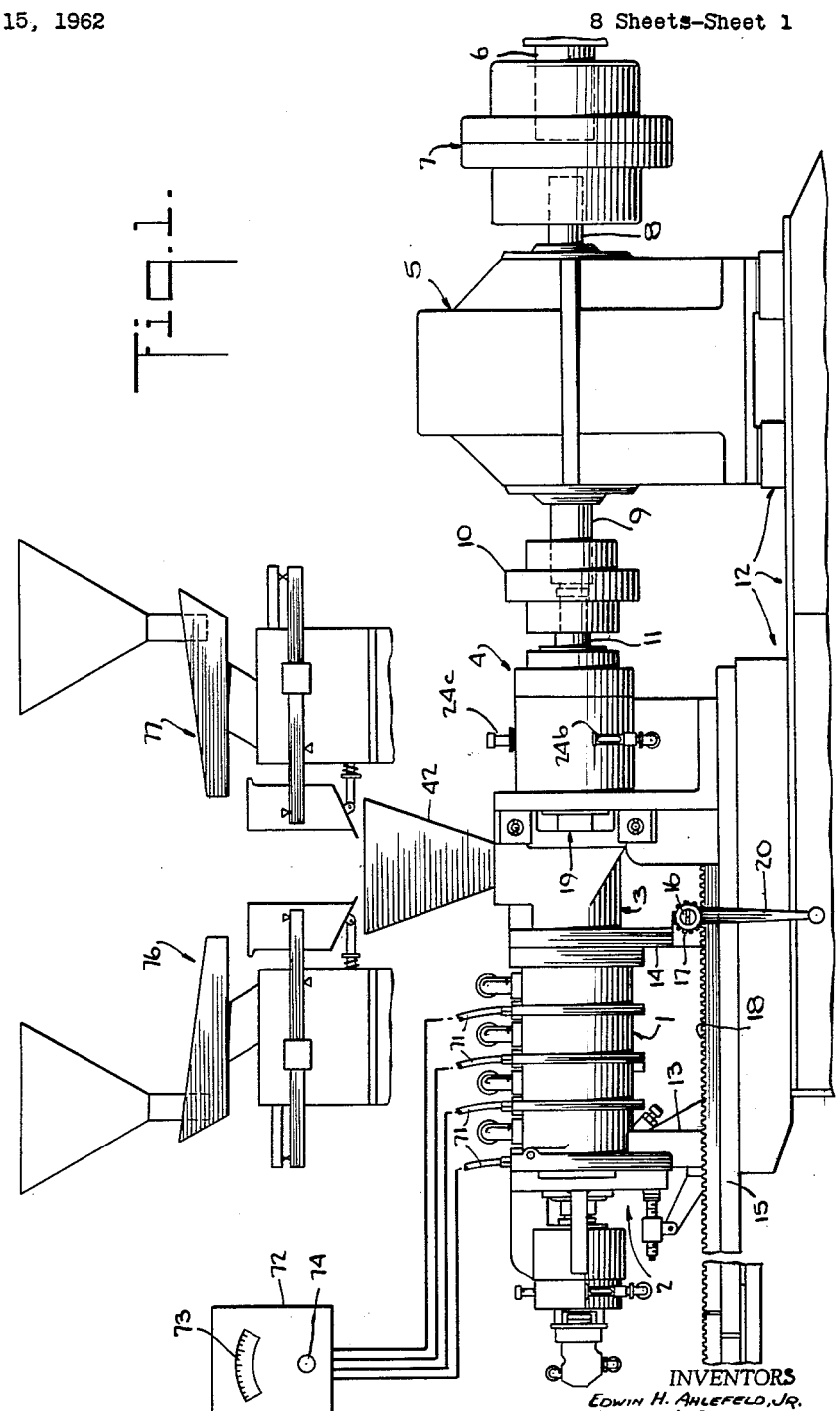
INVENTORS
EDWIN H. AHLEFELD, JR.
ARNOLD J. BALDWIN
PETER HOLD
WALTER A. RAPETSKI
HANS R. SCHARER
BY
ATTORNEYS

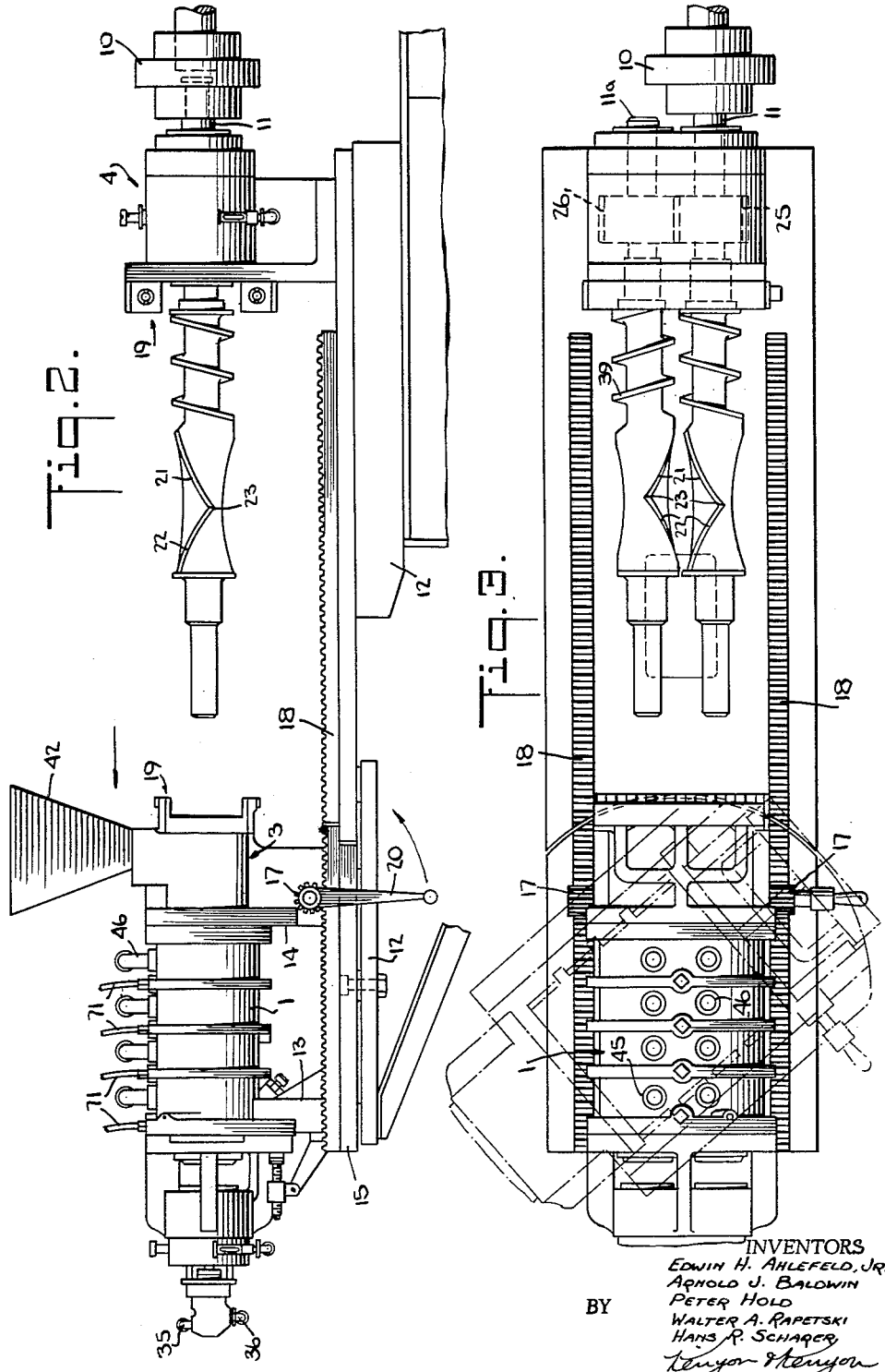

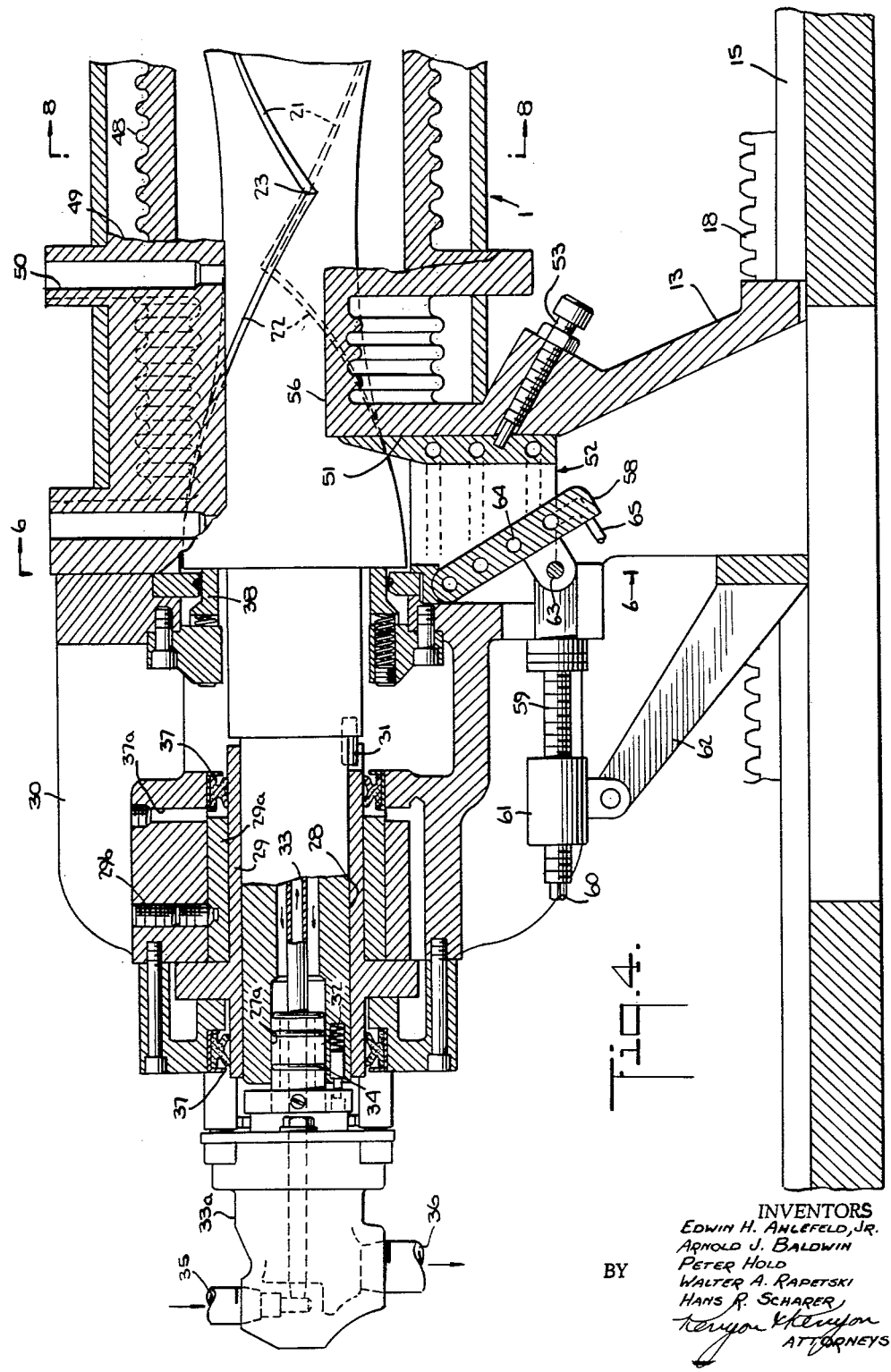

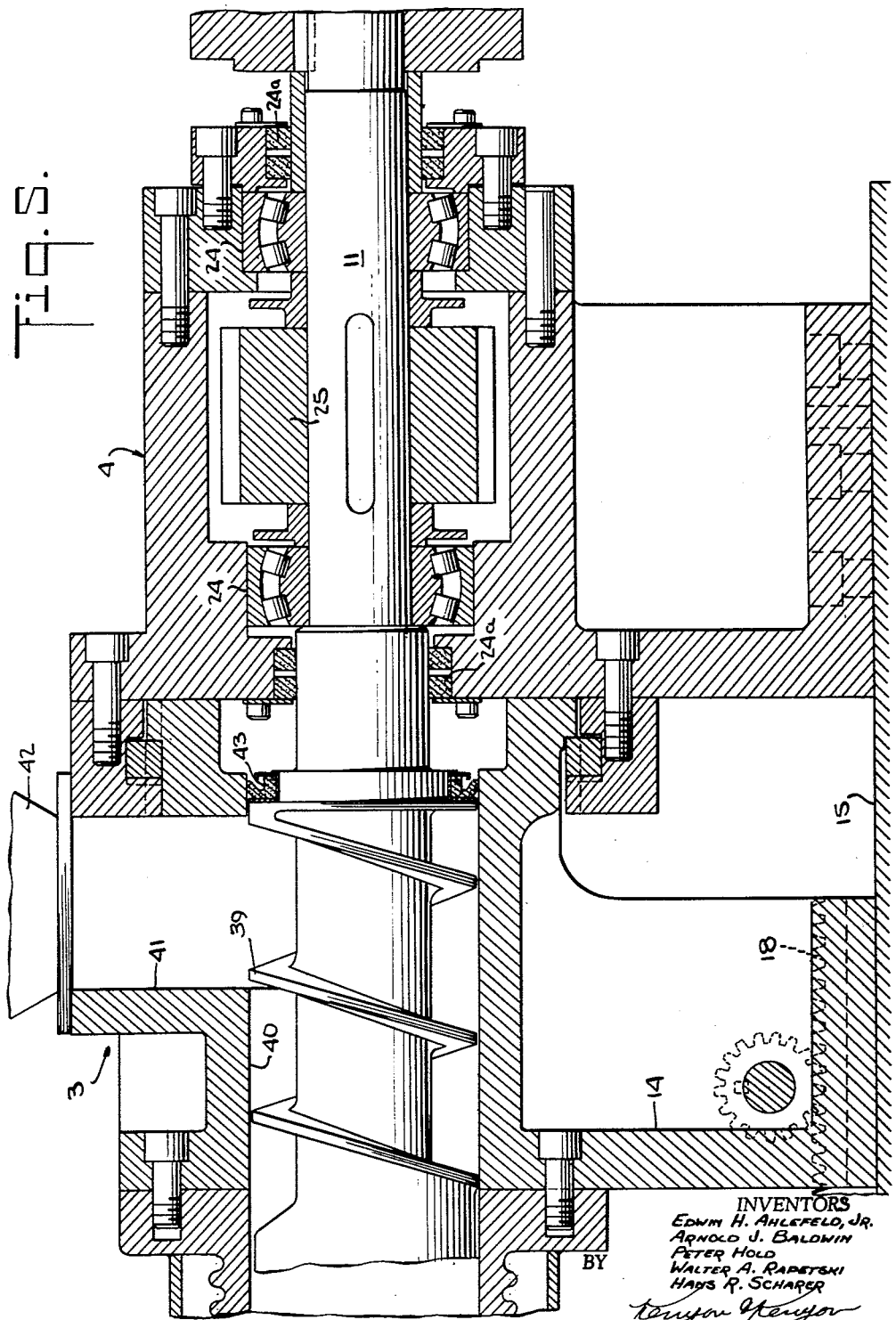

Nov. 3, 1964   E. H. AHLEFELD, JR., ETAL   3,154,808
CONTINUOUS INTERNAL STIFF-GEL MIXER
Filed May 15, 1962   8 Sheets-Sheet 5

INVENTORS
EDWIN H. AHLEFELD, JR.
ARNOLD J. BALDWIN
PETER HOLD
WALTER A. RAPETSKI
HANS R. SCHARER
BY
Kenyon & Kenyon
ATTORNEYS Nov. 3, 1964    E. H. AHLEFELD, JR., ETAL    3,154,808
CONTINUOUS INTERNAL STIFF-GEL MIXER
Filed May 15, 1962    8 Sheets-Sheet 6

INVENTORS
EDWIN H. AHLEFELD, JR.
ARNOLD J. BALDWIN
PETER HOLD
WALTER A. RAPETSKI
HANS R. SCHARER

BY
ATTORNEYS

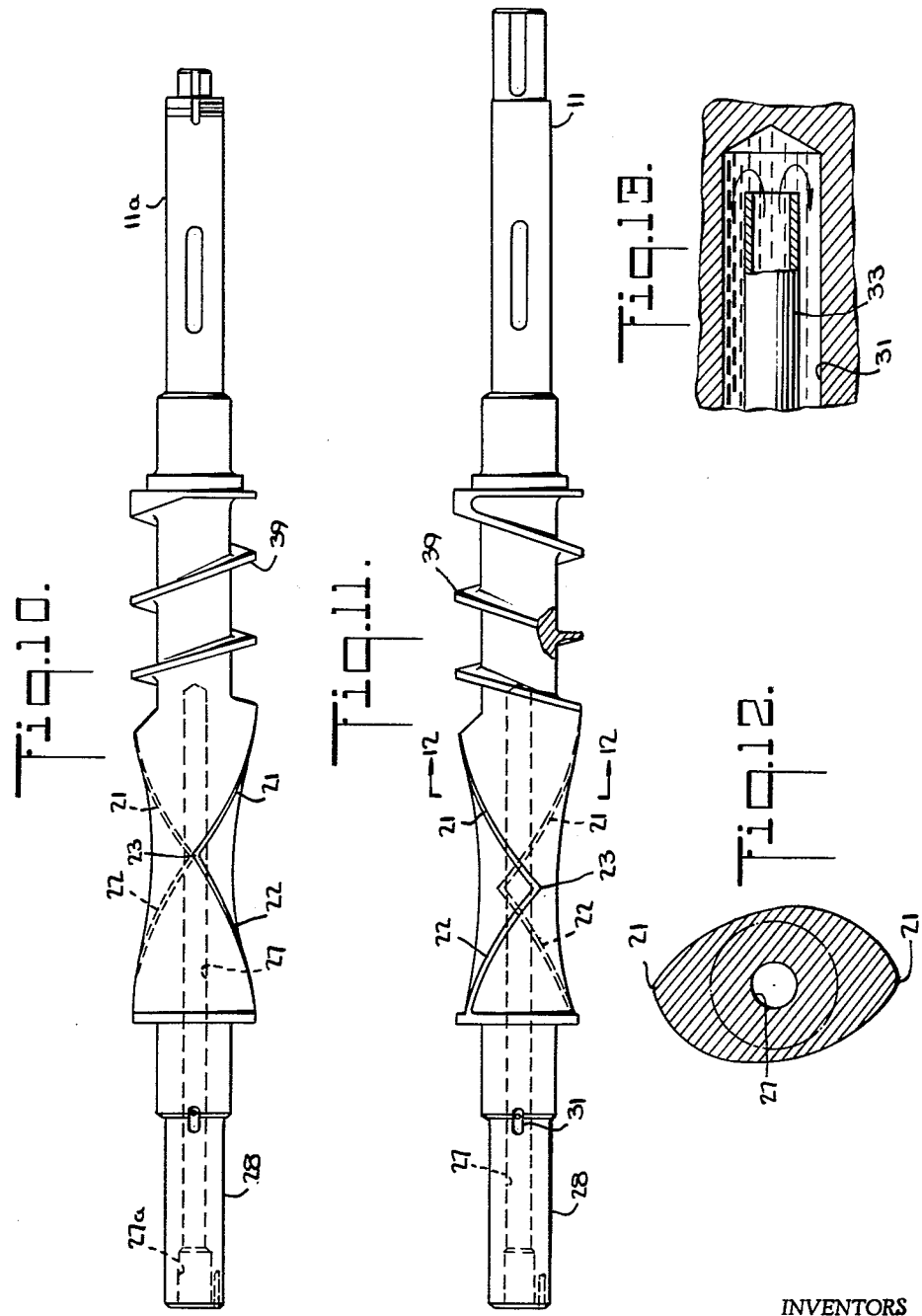

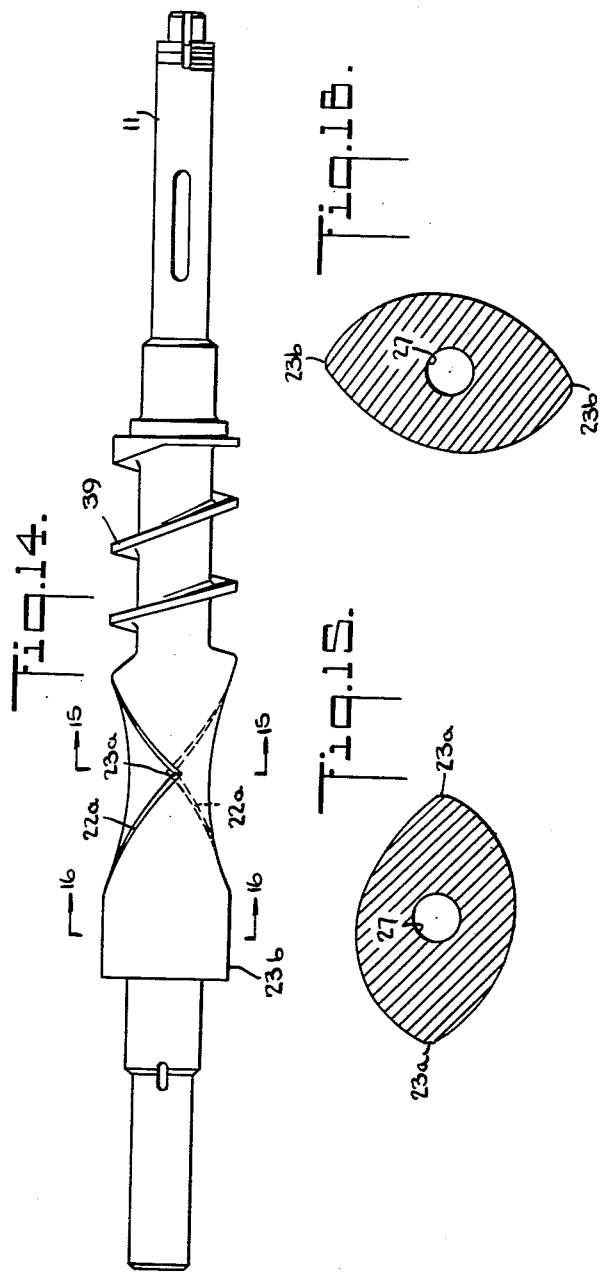

United States Patent Office 3,154,808
Patented Nov. 3, 1964

3,154,808
CONTINUOUS INTERNAL STIFF-GEL MIXER
Edwin H. Ahlefeld, Jr., and Arnold J. Baldwin, Woodbridge, Peter Hold, Milford, Walter A. Rapetski, Orange, and Hans R. Scharer, Wallingford, Conn., assignors to Farrel Corporation, a corporation of Connecticut
Filed May 15, 1962, Ser. No. 194,814
11 Claims. (Cl. 18—2)

This invention relates to a continuous internal mixer capable of mixing not only stiff-gels in general but also the rubbers, elastomers, and plastics which heretofore could be handled only by batch-type machines. For example, heretofore the dispersion of carbon black in rubber and the plasticizing of unplasticized polyvinyl chloride and rigid polyvinyl chloride under commercial working conditions, have necessitated the use of either an open roll mill or an internal mixer. These can handle material only in batches.

Some prior art U.S. patents indicate that continuous machines they disclose can mix satisfactorily practically everything. However, each type of mixer has its particular uses and limitations. The reader unfamiliar with this art in referred to the Encyclopedia of Chemical Technology, The Interscience Encyclopedia, Inc., New York, New York, 1952, vol. 9, pp. 154–166.

Commercially, the roll mill is disappearing. Its disadvantages are well known. Today most rubber products reinforced with carbon black are mixed in internal mixers of the vaned-rotor type made and sold by the Farrel-Birmingham Company, Inc., Ansonia, Connecticut, under that company's registered trademark, "Banbury."

Prior to the present invention none of the continuous machines suggested by prior art patents or elsewhere, have been able to supersede the open mill or the Banbury type mixer. These are the only machines that have provided the combination of time and temperature control and mixing intensity with each capable of variation by the operator completely enough to permit the handling of even the toughest mixing problems.

For example, in the manufacture of rubber, mixing is the operation required to obtain a thorough and uniform dispersion in the rubber of the ingredients called for by the formula. Whether done in an open roll mill or in a Banbury type mixer, a definite time and temperature schedule must be followed. If poor dispersion is encountered, the cause of trouble must be immediately established and corrected. Faulty compounding materials, too short a mixing cycle, improper temperature control, or wrong batch size may be factors to be investigated if troubles are noted. Such investigation and adequate correction are quick and positive in the case of the batch-type machines, whereas the prior art continuous machines have not had the flexibility required for either investigation or correction.

It has been natural that efforts have been made to develop continuous mixing machines which could substitute adequately for the batch-type machines. Most of these efforts have been directed towards the idea of variations of screw-type extruders and plasticators intended to be charged at one end with the unmixed material and to discharge this material through the other end in a mixed condition. These machines have not provided adequate control of time, temperature and mixing intensity to the degree demanded by work such as rubber mixing.

Any batch-type mixer introduces material handling disadvantages. The ingredients must be weighed and packed in containers which must be stored and handled for each batch. Automatic weighing and feeding machines deliver continuously and cannot be used. Another disadvantage is that exactly at the end of each mixing period, a batch-type mixer must dump its batch. This batch usually must go through sheeting mills, a screw extruder or pelletizer or in some other way be passed on expeditiously for further processing. Such large intermittent deliveries for further processing require the installation and maintenance and operation of multiple units because these are continuous machines which must handle large intermittently delivered batches.

Many years ago the Farrel-Birmingham Company, Inc. started a program aimed at providing a continuous mixer having the capabilities of batch-type mixers. Ultimately success was achieved by the present inventors, their invention now being incorporated in a continuous machine actually installed and operating in the research laboratory of the just-mentioned company. Representatives of the rubber industry have had an opportunity to see this machine doing the jobs which they previously thought required a mixer of the batch-type but now performed by a machine operating continuously.

Basically the present invention includes a means for forming a mixing enclosure having interspaced entrance and exit openings and containing mixing means which cannot by itself drive material through this enclosure although it does permit material to be moved through this enclosure while being mixed thoroughly. Therefore, the mixing time of the material in the enclosure is independent of the action of the mixing means, and instead is dependent on the rate at which more material is pushed into the entrance opening so as to push through the material already in the enclosure and cause the portion adjacent to the exit opening to be pushed out through the latter at a corresponding rate. The mixing means may be made to introduce a lateral push on the material to force it through the exit opening when the latter is located laterally with respect to the enclosure. It is possible to control externally the rate at which the material is pushed into the entrance opening. It is possible to provide mixing means that does not cause extensive intermingling of the material longitudinally between the two openings so that material just pushed in receives extensive lateral mixing action for a time dependent on the time it takes to travel to the exit opening which time, in turn, is dependent on the rate at which more material is pushed into the entrance opening. By varying the size of the exit opening the pressure on the material required to push it therethrough and therefore the pressure on the material being mixed, may be controlled. It follows from the foregoing, that a continuous mixer can be made which provides for completely controllable mixing time and pressure which are important factors determining the temperature and mixing intensity imparted to the material.

This new continuous machine uses the above basic principles and includes a barrel forming two laterally inter-connecting cylindrical chambers having at one end a common lateral discharge orifice or exit opening. Contra-rotating bladed rotors work in the two chambers. The other end of the barrel has an entrance opening and a screw feeder provided with a hopper for receiving the material to be mixed, this screw feeder pushing or stuffing the received material into the ends of the two chambers. The rate at which material is fed to this hopper may be controlled easily.

Each rotor forms oppositely projecting blades having a cross sectional contour which is substantially the same as that of a Banbury type mixer blade. An important difference is that each blade starts out at its loading end with a twist that gradually turns away from or backwardly relative to its rotation until it arrives at a location spaced between the ends of the rotor, the blade then continuously and without interruption twisting in the opposite direction towards the discharging end of the rotor. Each blade lengthwise is continuous from end to end as a general rule. The junctions between the oppositely twisting portions of each blade is ordinarily in the form of an apex facing circumferentially in a direction opposite to the direction of rotation. The length and twist ratio between the two helical portions of each blade is such that when the chamber contains material the average of any and all of any axially directed forces, that is to say the algebraic sum of these forces, applied to the material by the rotating blades is insufficient by itself to force the material through the discharge orifice. The degree of twist is such that there is no extensive circulation or pumping of the material at any localized zone in a direction that is axial with respect to the rotors and chambers.

Another distinctive feature is that the discharge orifice has a depth in the axial direction of the machine that is relatively very small as compared to the overall length of the chambers and rotors. The width of this orifice in the radial or circumferential direction with respect to the rotors, is much greater than this depth. The orifice is like a rather wide but shallow or short slot extending transversely with respect to the machine. It is located centrally across the junction of the two cylinders with each other, and in overlapping relation with respect to the adjacent ends of the two blades or rotors. The blades exert lateral forces on the material and can push material adjacent to this orifice out therethrough.

Further, this discharge orifice is provided with walls which extend transversely outwardly from the two rotors to form what might be called a rectangular tube which is long enough so that it provides a substantial frictional restraint to material discharging through the orifice and passing between these walls. One of the walls is hinged at its top so that its lower end may be moved towards the opposite wall so that in addition to the frictional restraining action the flow of material receives shear and must resistingly strain to get through for complete discharge. The angularity of this hinged wall is adjustable. Other means for varying the cross sectional area of the discharge opening might be used.

Although the rotor blades do not feed longitudinally they do have the ability to stuff the mixed material through this discharge orifice when the chambers contain enough material lengthwise. Thus the screw feeder is only required to move material to the discharge orifice. Therefore, by controlling the rate at which the material is fed, the travel of the material through the machine is correspondingly controlled.

The barrel of this new machine has hollow walls through which cooling or heating fluid may be passed. High heat-exchange capacity is provided because the new rotors give great mixing action with consequent formation of great heat, and extensive cooling may then be required. The walls of the orifice, referred to above, may be excessively cooled by this cooling action and tend to cause material delivery troubles. Therefore, these walls are provided with passages for the passage of heating fluid for use when necessary to overcome such troubles.

With proper design these structural points of novelty provide for the following new principles of operation:

Assuming that the machine is in full operation, its manner of starting being described hereinafter, the described rotor blades provide for a full "Banbury" type mixing operation minus the normal extensive pumping action longitudinally with respect to the rotors which has heretofore been considered to be desirable. Rotation of the blades does cause some longitudinal flow but this is of very short extent and is more or less sinuous in nature. The material cannot escape through the discharge orifice unless more material is forced into the charging end of the barrel because this orifice chokes the escape of the material otherwise. However, as soon as more material is charged into the receiving end of the machine it is forced into the loading end of the machine so as to of necessity force a corresponding amount towards the discharge orifice, the force feeding action of the receiving and feeding means being adequate to put enough pressure on the material inside of the two chambers to cause the material to move lengthwise through the barrel's chambers to the area opposite to the discharge orifice where the blade portions adjacent thereto can push the material to cause the discharge by overcoming the choking restraint of the orifice and its side walls.

In effect, the two chambers and the two rotors in a lengthwise manner form a series of the prior art "Banbury" type machines which travel along, successively being loaded and after a controlled time, unloaded. It is as though there were, in the new machine, a plurality of longitudinally superimposed radially extending traveling laminations of the material being mixed, each blending with the other but without the mixing material in any lamination being pumped extensively into the material of adjacent layers. The moment enough material is charged in the loading end to form what might be called a new lamination, the last lamination or layer or baby Banbury type batch at the discharging end, is discharged. This action may be pulse-like or a continuous flow. The operator of the machine, by controlling the rate at which the material is charged in the hopper, can control accurately the mixing time because he controls the residence time of what might be called each little batch traveling lengthwise through the machine. Pressure is controlled by controlling the discharge orifice size.

Admittedly the above is an imaginative analysis to the degree that the flow is homogeneous, but it is true in that the machine does not mix longitudinally to any degree which might prevent all components from remaining in the machinef or the same travel time.

The barrel forming the two chambers is provided with a longitudinally extending series of individually controllable laterally extending chambers individually adapted to conduct a flow of heating or cooling fluid, thus giving zone control throughout the length of the machine. Therefore, as each little so-called batch travels from zone to zone its rate of cooling or heating may be controlled like the control permitted by a Banbury type machine.

Still further, by controlling the swinging wall of the discharge orifice the pressure on the material in the barrel may be controlled, whereby to correspond to the use of the floating weight of a Banbury type mixer. In the actual operation of the machine, an automatic weighing feeder is used which, due to its construction, charges the machine intermittently but in rapid succession with minute charges of material. To this extent the somewhat imaginative concept of tiny batches going through the machine is preserved. With completely continuous feeding, the action remains the same. Both give forward pressure against which the back pressure of the orifice control reacts.

When the material is rubber and carbon black, just as in the case of a batch-type unit, there is a small chance that the carbon black may not be completely dispersed until at the very end of the cycle. The discharge orifice, which it will be remembered is of relatively shallow depth but relatively great lateral extent, permits the adjacent rotor blades to shave off or push off little increments of material at the end of the continuous mixing and force them through the orifice so that the discharged material represents an average condition of the material at the end of the machine. This has proven to be of some importance in assuring that the discharged material represents a dispersion free from concentrations to a degree substantially equalling that attainable by a batch-type operation. Because the components of the material being mixed, may be fed continuously or substantially continuously, control of their proportioning is facilitated. With this continuous machine the components may be fed by automatic machines which feed predetermined amounts at predetermined rates from bulk supplies, thus avoiding the material handling problems of batch-type machines.

As previously indicated each rotor forms two oppositely extending blades and each of these blades extends so as to overlap the lateral or transverse discharge orifice. The discharge orifice is located laterally between the travelling paths of the peripheries of the blades of the two rotors and the two rotors are powered to rotate towards this orifice. This required that the rotors contra-rotate so that as their respective peripheries approach each other they move towards the discharge orifice. One rotor may be turned faster than the other.

The lengthwise blade continuity is of importance when in conjunction with the contour causing each blade to first twist backwardly with respect to its rotation and then twist forwardly with respect thereto. In addition to providing a rough balance of the axially moving forces applied to the mixing material to a degree preventing the rotor action from force feeding the material through the discharge orifice, the material is being pushed towards the orifice end of the barrel and at a later stage is being pushed away from this orifice end. The result is a tendency to crowd the material against itself by the oppositely directed forces so that in addition to the material being smeared against the inside of its chamber while being extruded diagonally back and forth longitudinally with respect to the rotors, it is smeared and extruded circumferentially with great force. A modification or variation may consist in providing a straight or plateau-like portion for each blade where the blades overlap the discharge orifice. With the blades turning towards this orifice there is then an increased tendency to stuff the mixed material through the orifice which tendency becomes fully effective whenever more of the material is forced or stuffed into the loading end of the barrel. Better mixing may also result.

The construction of the new continuous mixer is illustrated by the accompanying drawings in which:

FIG. 1 is a side elevation;

FIG. 2 is also a side elevation showing the major parts illustrated by FIG. 1 but with the machine opened for servicing or changing of the rotors;

FIG. 3 is a top plan view of FIG. 2;

FIG. 4 is a vertical longitudinal section of the left-hand or discharge end of the machine, this section showing the parts of the side of the barrel shown by FIGS. 1 and 2, the corresponding parts of the other half of the barrel being substantially the same;

FIG. 5 is a section corresponding to that of FIG. 4 but showing the right-hand or charging end;

FIG. 10 is a side view showing one of the rotors;

FIG. 11 is a side view showing the other of the two rotors;

FIG. 12 is a cross section taken on the line 12—12 in FIG. 11;

FIG. 13 is a detail view in cross section showing the water heating or cooling action that occurs internally within the rotors;

FIG. 14 is a view similar to FIG. 10 but showing a modification of the blade contour;

FIG. 15 is a cross section taken on the line 15—15 in FIG. 14; and

FIG. 16 is a cross section taken on the line 16—16 in FIG. 14.

Figure 6:
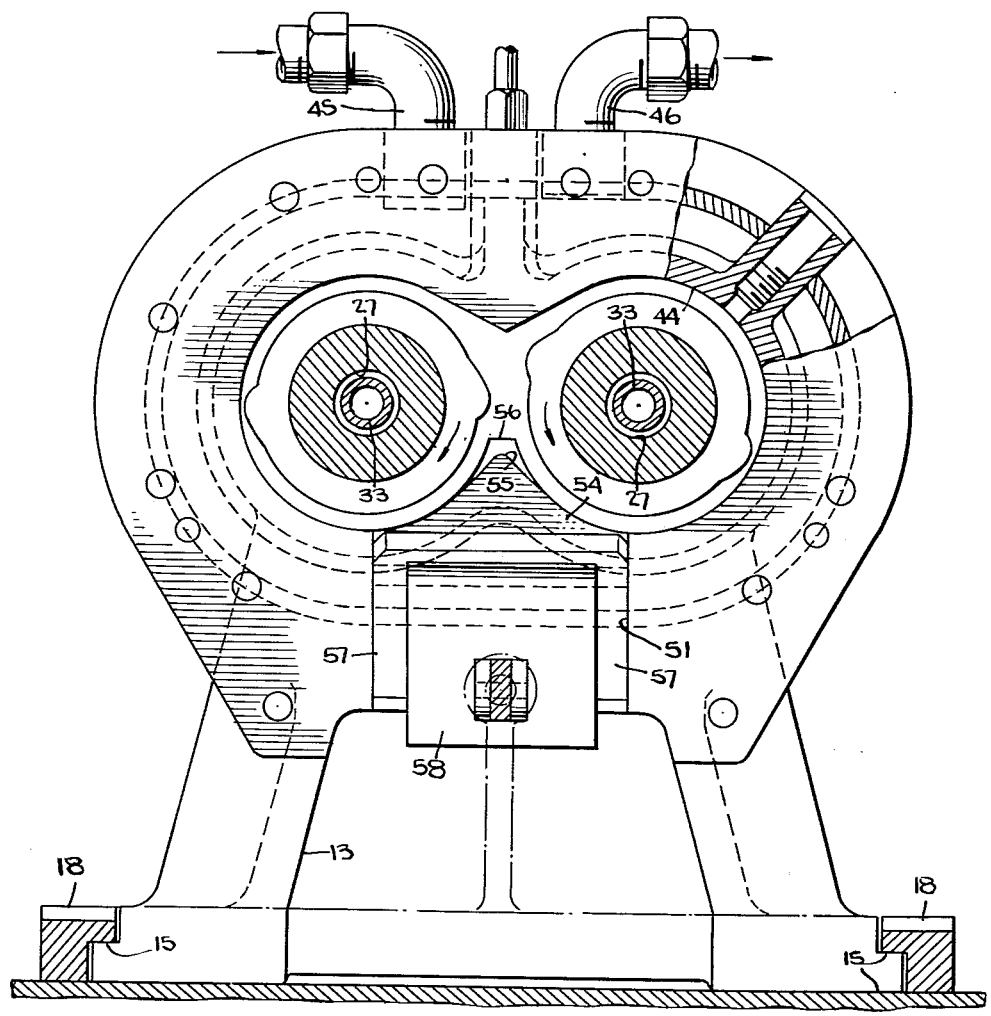
FIG. 6 is a cross section taken on the line 6—6 in FIG. 4.

As shown by FIG. 1, the main exposed parts of this new mixer comprise the barrel 1 with its associated parts, the discharge orifice assembly 2, and the feeder 3 which receives the material to be mixed and stuffs it under pressure into the loading end of the barrel. In addition, there is a pinion housing 4 containing the intermeshed pinion gears for causing contra-rotation of the rotors, and a gear box 5 containing speed reduction gearing. A powered rotary shaft 6 is connected by a coupling 7 with the input shaft 8 of the gear box 5, the latter's output shaft 9 being connected by a coupling 10 with the input shaft 11 for the pinion gears within the housing 4.

Operation of the machine consumes considerable horse power at high torque and so the pinion housing 4 and gear box 5 must be large and heavy. Both of them are mounted stationary on a firm base construction 12.

The barrel 1 and its associated parts and the feeder 3 are mounted to slide horizontally to and from the above stationary parts. At the left hand or discharge end the barrel 1 has depending supports 13 and at the feeding or loading or right hand end the barrel 1 has depending supports 14. These supports ride in guideways 15 which are a part of the base construction 12. A horizontal transverse shaft 16 carries a pinion gear 17 which meshes with a horizontal longitudinally extending rack gear 18 that is fixed to the stationary base construction 12.

The barrel 1 and feeder 3 are rigidly interconnected to form a unit and a quick-releasable lock 19 normally locks the feeder 3 rigidly to the pinion housing 4. When the lock 19 is released the pinion gear 17 may be turned by a crank 20 to slide the unit comprising the parts 1, 2 and 3, away from the pinion housing 4. This exposes the rotors as shown by FIGS. 2 and 3. As previously indicated, the design of these rotors is important.

As shown by FIG. 12 the cross sectional design of these rotors corresponds generally to the cross sectional design of the old batch-type Banbury-type rotor blades. The difference is that as shown by FIGS. 10 and 11, as well as by FIGS. 2 and 3, the oppositely projecting blades start out at their loading or right hand end with a twist or helical section 21 that generally turns away from or backwardly relative to the rotor rotation, until they arrive at a location spaced between the ends of the rotor. Then the blades continuously and without interruption twist in the opposite direction, as at 22, towards the discharging or left hand end of the rotor. The junctions between the oppositely twisting or helically contra-pitched portions of each blade are in the form of apices 23 in the case of the forms shown by FIGS. 13 and 14.

Because the rotors contra-rotate the twist of the helical portions of the oppositely extended blades of each is opposite to the pitch of the other. This can be seen by examining FIGS. 3, 10 and 11, the latter two figures showing in enlarged scale the pair of rotors shown installed in the machine.

The rotor of FIG. 11 is the one towards the observer in FIG. 2 and it integrally includes the shaft 11 that can be seen in FIG. 1 connecting with the coupling 10. This shaft mounts this rotor by being journaled in spherical anti-friction bearings 24 mounted by the pinion housing 4. Rotor thrust is almost absent and these bearings are adequate. One of the pinion gears 25 is keyed to this shaft and the other pinion gear 26, required for contra-rotation, is keyed to a shaft 11a of the rotor shown by FIG. 10 and which is correspondingly mounted by unillustrated anti-friction bearings located behind the plane of FIG. 5, by the pinion housing 4. These bearings are similar to the bearings 24 that can be seen in FIG. 5.

As shown by FIG. 2 the rotors project as cantilevers from the pinion housing 4 when the movable parts are slid away or opened from the stationary parts. Thus servicing and cleaning are made easy, and when desired the rotors may be easily removed and replaced by others. Both rotors by normal engineering methods may be mounted so that they may be quickly pulled from the pinion housing 4 when desired.

The rotors each have a bore 27 extending throughout their bladed portions and opening from their ends opposite to their shafts 11 and 11a. These ends each form a stub shaft 28 that is externally smooth. These stub shafts are slidingly received within tubular journals 29 running in plain bearings 29a mounted by a bracket 30 secured to the left hand end of the barrel 1. Pins 31 key the shafts 28 to the journals 29. The open ends of the bores 27 are provided with counter bores 27a which slide over the connectors 32 of commercially available fluid inlet and outlet couplings 33 secured to the bracket 30, one for each of the rotors. The connectors 32 have O rings 34 for sealing with the counter bores 31 and provide projecting pipes 33 which extend into the bores 27 almost to their inner or right hand ends. The units 33 each has an inlet 35 and an outlet 36, the inlet 35 connecting with the pipe 33 and the outlet 36 connecting with the space between the pipe 33 and the inside of the bore 27, in each instance. The rotors are free to rotate relative to these couplings 33.

When the parts are slid apart or separated to expose the two rotors, the rotor shaft 28 can freely separate from the journals 29 and the connectors 32 described above. The sliding surfaces of the journals 29 and plain bearings 29a are ordinarily kept free from dirt and their lubrication is retained by seals 37. Seals 38 engage the left hand butt ends of the rotors during operation of the mixer to prevent any loss of the material being mixed when the mixer is in operation, and these seals also permit the described separation of the parts.

Between the right hand shaft portions 11 and 11a and the blades, each rotor has a helical feed screw 39 of the proper pitch for its rotation to feed material towards its blade. These fit in cylinders 40 formed as forward extensions of the two cylindrical chambers of the barrel 1 described in detail heretofore. Vertical ports 41 fed by a common hopper 42 serve to feed the material to be mixed to the feed screws 39 which then stuff the material to the left and into the loading ends of the chambers of the barrel 1. Seals 43 prevent loss of material to the right, keeping in mind that the feeding action is in the opposite direction. All of these parts permit the longitudinal sliding required to open up the mixer for exposure of the rotors.

The barrel 1 internally forms the two parallel laterally interconnecting cylindrical chambers 44 in which the rotors rotate. The relative diameters of the rotors and of these chambers 44 are such as to leave a space between the rotor tips and the chamber walls through which the material may be extruded while being smeared against the chamber walls. The barrel is hollow for receiving cooling or heating fluid and is divided lengthwise into a plurality of sections each separate from the other and each having its own fluid inlet 45 and outlet 46. Thus for each section a cooling space 47 is provided which is isolated from the cooling spaces of the other sections so as to lengthwise of the barrel provide for zone temperature control throughout the length of the barrel. In each instance the cooling space 47 is large and the inner wall of the barrel forming the chamber 44 is externally finned as at 48 to provide great heat exchanging capacity. The dividing wall 49 between the chambers and each cooling section has a vertical bore 50 which extends into the interior rotor chamber space at a location intersecting the lateral intercommunicating spaces between the two chambers. The purpose of these bores 50 is described later.

Figure 7:
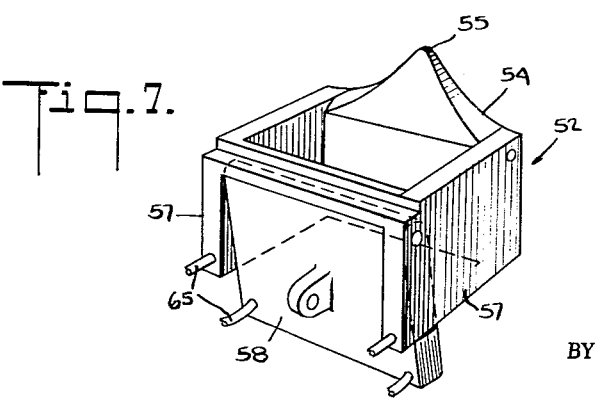
FIG. 7 is a perspective view showing details of the discharge orifice assembly.
Figure 8:
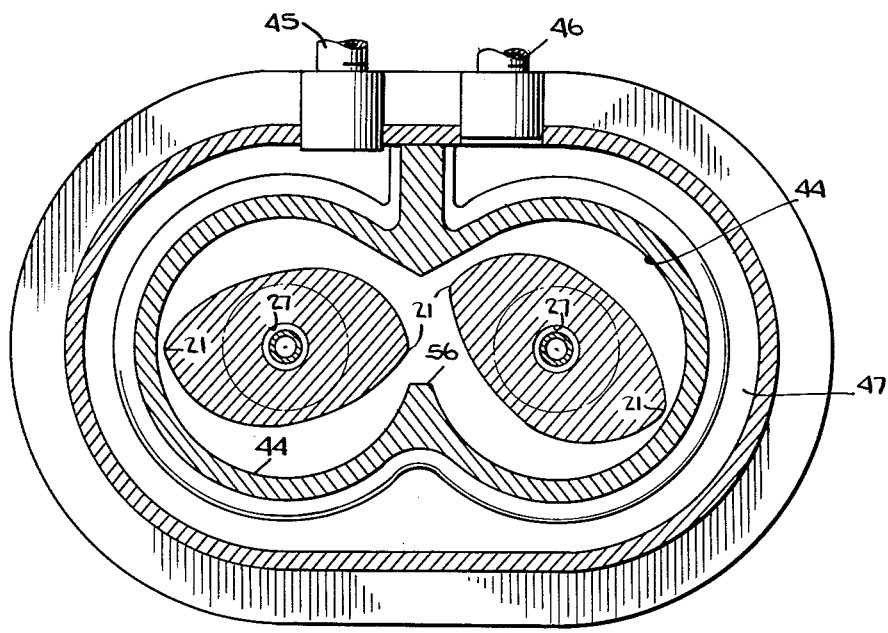
FIG. 8 is a cross section taken on the line 8—8 in FIG. 4.

The common discharge orifice for the two cylindrical chambers 44 is shown in FIGS. 4, 6 and 7 in detail. There it can be seen that the barrel 1 is formed at its discharge end to provide a rectangular depending opening 51 in which a discharge orifice assembly 52 is slidably fitted. This assembly is locked in position by a releasable screw 53 which can be backed off to permit the assembly to be removed downwardly from the barrel so that the assembly may be cleaned or otherwise serviced. As shown by FIG. 4 a part of the bracket 30 confines the left hand side of the assembly 52 and in an emergency this bracket 30 may be removed so as to more fully release the assembly 52. The bracket 30 is screw fastened to the barrel 1 and is therefore removable.

In more detail, the assembly 52 has a front wall 54 that extends upwardly to a point 55 while tapering in thickness to this point. The point 55 is located directly behind the short upstanding flat topped wall 56 where the lower mutually adjacent portions of the two chambers 44 join together, the space above the top of the wall 56 providing the lateral intercommunication between the two chambers 44. The described construction of the wall 54 provides for a streamlined effect with respect to the flow of the mixed material when it is forced from the barrel. The assembly 52 includes the sidewalls 57 and the back wall 58 which is hinged at its top edge so that it may be swung inwardly toward the wall 54 more or less, under the control of a screw 59 having a flat sided end 60 to which a wrench may be applied. This screw 59 is in threaded arrangement with a nut 61 pivotally connected to an arm 62 extending from the supports 13, and the screw 59 connects with the wall 58 by a pivotal connection 63. All of the walls of the assembly 52 are provided with fluid passages 64 provided with suitable connections 65 so that fluid may be passed through the walls to provide for temperature control of the orifice assembly.

It is to be noted that as shown by FIG. 6 the width of the orifice provided by the assembly 52 is relatively great, it encompassing almost the whole of the two mutually adjacent lower circumferential quarters of the two chambers 44. On the other hand as can be seen from FIG. 4 the depth or extent in an axial direction with respect to the rotors is very short as compared to the overall length of the rotors. Furthermore, the vertical length of the walls of the assembly 52 is of relatively great extent. This length exceeds the radius of the chambers 44 as the construction is illustrated.

Figure 9:
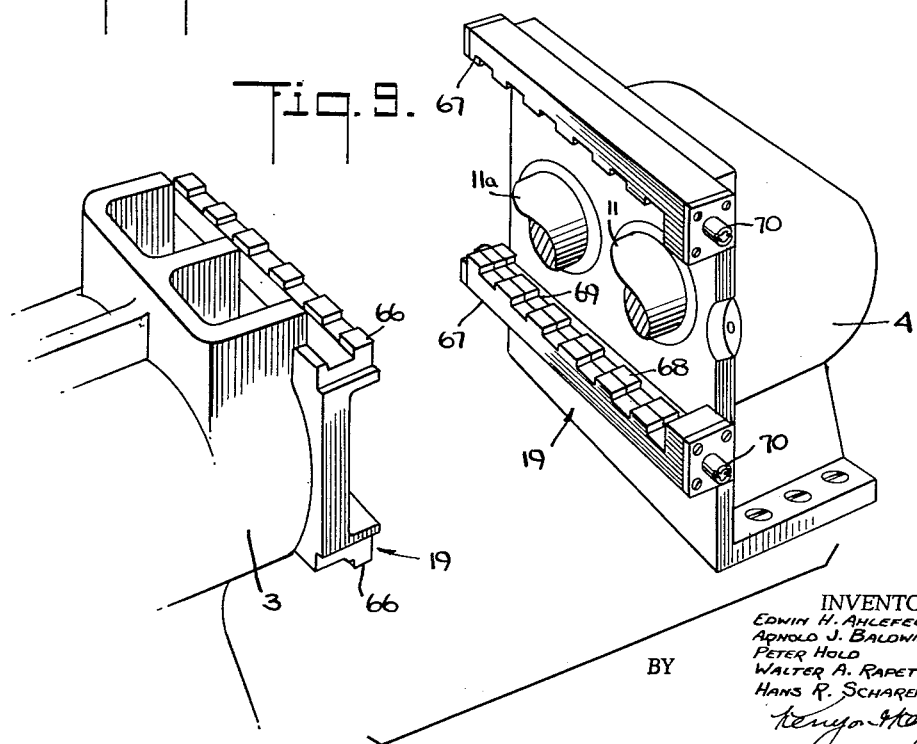
FIG. 9 is a perspective view showing a lock which normally holds together the parts shown opened in FIGS. 2 and 3.

Rigidity between the barrel 1 and feeder 3 with respect to the pinion housing 4 depends on the quick releasable lock 19. As shown by FIG. 9 the right hand end of the feeder 3 is provided with a pair of vertically interspaced, mutually parallel castellated bars 66. The left hand end of the pinion housing 4 is provided with two mutually superimposed pairs of corresponding bars 67 and 68, located so that the bars 66 may pass completely across them in intermeshing relationship and so that the bars 66 are then located in spaces 69 between the bars 68 and the left end face of the pinion housing 4. The bars 68 may be longitudinally shifted by means of screws 70 and when the bars 66 are located in the spaces 69 these screws 70 are used to shift the bars 68 so as to lock the bars 66 against retreating from the pinion housing. In this fashion a firm interlocking is effected which is at the same time easily releasable.

The vertical bores 50 which extend into the chambers of the barrel 1 at various locations, are used for various purposes, or they may be plugged closed in one or more instances. The general purpose of these bores is to permit the mounting of thermo-couple elements or the like in the temperature-controlled zones of the machine. In some instances it may be desired to introduce fluids to the material being mixed at predetermined phases of the mixing action, the addition of oil being an example, and in such instances pipes may be connected to one or another of the bores 50 registering with the mixing zone or zones where the addition is desired.

As shown by FIG. 1 these bores 50 have thermo-couple units 71 screwed into each of them and these units are connected to a tetmperature indicating device 72 having a scale 73. This instrument is provided with a selector switch 74 so that any one of the four thermo-couples may be connected with the instrument 72 so that the scale 73 indicates the temperature of the material being mixed in the zone where the selected thermo-couple is located.

The manner of making the illustrated machine should be understandable to anyone skilled in the design and construction of heavy duty mixers of the Banbury-type. The barrel can be made by metal casting techniques, this also applying to the pinion housing and obviously to certain other parts. The rotors may be machined from solid metal using the machine shop practices which are also used to make Banbury-type mixer rotors. The drawings show various details that have not been referred to specifically because their function and nature should be apparent. For example, the plain bearing 29 is held in position in the bracket 30 by a set screw 29a and the bearing is adapted to be flooded with lubricant applied through a screw blocked passage 37a, seals 37 preventing loss of this lubricant. As previously indicated the part 33 is a commercially obtainable item. The shaft holes for the pinion housing 4 are provided with seals 24a for retaining the lubricant with which this housing would ordinarily be filled. Ordinarily the rotors would not be pulled from the pinion stand very often and when this is done the pinion housing 4 may be emptied of its lubricant. In FIG. 1 the pinion housing 4 is shown as provided with a lubricant level gauge 24b and an inlet 24c through which the lubricant is poured into the housing originally. In general the individual parts are held together by screws which have not been described specifically.

It was previously mentioned that this new continuous machine may be fed continuously or substantially continuously with the material to be mixed and therefore, in FIG. 1 automatic weighing feeders 76 and 77 are shown feeding into the hopper 42 of the feeder 3. These machines 76 and 77 are commercially available and operate to deliver intermittenly but in very close succession, accurately weighed quantities of material. The intermittent feedings are so close together as to be in effect continuous and, if desired, automatically feeding-rate controlled machines can be designed for truly continuous flow delivery.

*Operation*

In the case of the batch-type mixer of the Banbury-type it is necessary to determine and establish the mixing schedule by running a test program aimed at setting up the mixing time, temperature control, horse power and the other variables which are available and which provide for the nice degree of mixing control for which these mixers are famous.

Correspondingly, with the new machine and its corresponding flexibility of the various mixing control factors, corresponding accurate establishment of mixing schedules is possible.

With the above in mind, the machine with its parts locked together as shown by FIG. 1, and with its rotors rotating by a suitable power source driving through the coupling 7, the two chambers 44 are first loaded with the material to be mixed.

This is done by loading the material through the hopper 42, the screw blades 39 forcing the material forwardly into the chambers and the swinging wall 58 being adjusted to a flow choking position. With the chambers loaded the screw blades 39 continually try to press the material towards the left while the orifice assembly 52 prevents the material from leaving the chambers. Consequently, the material in the chambers is placed under pressure and experiences the typical Banbury-type action excepting that the familiar longitudinal pumping or flowing is substantially absent. At this time the scale 73 of the temperature measuring instrument 72 of course shows a rapid temperature rise throughout the various zones of the barrel 1, and cooling water flowed through the various chambers 47 is used to restrict the temperature rise. Cooling water flowed through the bores 27 of the rotors keeps the latter from becoming excessively hot.

Now by controlling one or the other or both of the automatic feeders 76 and 77, the substantially continuous feed of the material into the hopper 42 of the feeder 3 is adjusted. At this time the swinging wall 58 is gradually swung outwardly to reduce the discharge choking effect of the orifice assembly 52. Continuous or substantially continuous flow conditions are now beginning to be established.

Control of pressure within the mixer under these continuous flow conditions is under full control by varying the discharge choking action of the orifice assembly 52. As the blades counter rotate towards the mouth of this assembly they continuously try to stuff material through the orifice provided by the four rectangular walls of this assembly. Discharge is resisted both by the choking effect afforded by adjustment of the swinging wall 58 and by the length of the orifice. Temperature control of the orifice assembly is available by introducing water through the various passages 64 and as previously indicated this may require the use of hot fluid so that the discharging material is not excessively cooled. It can be seen that pressure control within the mixer is variable to correspond to the control provided by adjusting the pressure on the floating weight of a Banbury-type mixer.

Total mixing time is under complete control because this depends upon the rate at which the automatic feeders 76 and 77 are adjusted to feed the material. This cannot provide mixing time control satisfactorily when using screw type continuous mixers.

Mixing time control is where the peculiar contour of the new rotors is of such great importance. As each little increment of material fed to the hopper 42 is stuffed by the screw blades 39 into the right hand end of the barrel 1, it receives a forward or left hand moving force from the helical or twisted portions 21 of the rotor blades. However, the material cannot go forwardly because of the counter pressure exerted on previously fed material by the portions 22 of the blades which are attempting to move the material backwardly. The two helical portions of each blade apply oppositely directed forces to the material which can move forwardly only to the degree that the increased pressure on the material in the chambers, due to the constant feeding of unmixed material, is sufficient to provide excess material which the rotors drive through the discharge orifice against the counter pressure or choking exerted by the latter. The resistance is due to the friction with the long orifice passage and the natural choking due to the dimensions and shape of the orifice cross section.

The newly added material at the right hand end of the chambers begins to mix. Any pumping action longitudinally with respect to the chambers is limited to a circumferentially sinuous motion as the material is smeared against the walls of the chambers, starts to move a little forwardly when close to the advancing rotor blades and is then extruded backwardly reversely between the rotor blades and the chamber walls through the space between these two. It can be seen that there is a typical Banbury-type mixing action but that for the tiny batch of material just added it is strictly localized lengthwise of the chambers.

With the addition of more material the above little batch, as it were, is shifted by the volume of the added material towards the left or discharge end of the mixing chambers. Mixing continues all the time but the partially mixed material cannot get to the discharge end of the chambers so as to discharge prematurely in only a partially mixed condition.

Keep in mind that in referring to small batches this is done merely for convenience of explanation. The analogy is accurate however, because as material is introduced to the loading end of the chambers it travels lengthwise through the latter without being pumped back and forth so as to result in its premature discharge through the discharge orifice.

As the material travels lengthwise while under the constant Banbury-type mixing action its temperature naturally rises just as it would in a batch type machine of the Banbury-type. This temperature rise is kept from becoming excessive by controlling the water flow through the various barrel chambers 47 each of which is separate from the other and provided with its own water inlet and outlet. By throwing the selector switch 74 from one to another of the thermo-couple units 71 conditions can be ascertained at the various locations in the chambers.

Ordinarily the temperature of the material should be adjusted to prevent harm to the material being mixed. This may require extensive water cooling and as previously indicated this may require such extensive cooling at the discharge end of the barrel as to necessitate the use of hot fluid for replacing the heat lost by the discharge orifice assembly 52. In other words the use of hot water through the passages 64 provides a heat shield between the discharging material and the heavily cooled barrel.

Maximum production rates demand the shortest possible mixing time compatible with complete mixing. Assuming one of the feeders 76–77 is feeding rubber and the other is feeding carbon black or some other material that introduces severe mixing problems, complete mixing is possibly just being effected almost at the very discharge end of the chambers. Since the rotors stuff the material slowly through the discharge orifice assembly 52 it might happen that this is done prior to complete mixing when maximum production rates are attempted. However, the very short depth or extent of the discharge orifice in the axial direction of the chambers and rotors, reduces this possibility to a minimum. The transverse width provides a passage of adequate overall cross sectional area. Therefore, no trouble is experienced under normal conditions with the presence of unmixed particles or lumps or carbon black or other material.

Just as when operating a Banbury-type mixer of the batch type, it is realistic to realize that when operating the new continuous mixer problems may arise. These are immediately detectable because of the continuous discharge of material and they are immediately correctable because mixing time, mixing pressure, mixing temperature, and mixing intensity through horse power control, are all under immediate and full control.

Obviously control applies to the composition of the material fed because the feeding rate of commercial weighing and feeding machines are easily variable. Although only two of these weighing and feeding machines are shown it is contemplated that a large number may be used depending on the mixing formula required. The flexibility of control of the new machine, instead of being a rigid and fixed matter as in the case of prior art continuous mixers, is under full control to an extent that even exceeds that possible when using the reliable Banbury-type batch mixer.

Once a mixing schedule is set it is unnecessary to use the multiplicity of temperature measuring devices located throughout the length of the barrel. Then some or all of the bores 50 may be used for the introduction of mixing components. In this way components can be added which would normally be added part way through the mixing schedule of the batch type mixer. Oil is an example of the type of material that may be added at a later time.

A machine constructed as illustrated and described hereinabove has run a long test program and been used for many demonstrations to skeptics who did not believe a continuous machine could do the job of the prior art Banbury-type batch type machine.

A modification of the rotor design is shown by FIGS. 14–16 wherein the sections corresponding to generally similar sections shown by FIGS. 10–12 are correspondingly numbered using the letter $a$ for identification while, in addition, providing straight portions 23a. In this case each of the portions described has a length approximating one-third the overall length of the rotor blade.

What is claimed is:

1. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means.

2. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said discharge orifice opening transversely from said chambers and at least mainly in overlapped relation with respect to the portions of said blades adjacent thereto.

3. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said discharge orifice opening transversely from said chambers and having a depth in the axial direction of said chambers that is relatively small as compared to the overall length of said chambers and rotors, and having a width that is substantially greater than its depth, said orifice being located centrally across the junctions of said chambers and at least mainly in overlapped relation with respect to the portions of said blades adjacent thereto.

4. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said discharge orifice opening transversely from said chambers and having a depth in the axial direction of said chambers that is relatively small as compared to the overall length of said chambers and rotors, and having a width that is substantially greater than its depth, said orifice being located centrally across the junctions of said chambers and at least mainly in overlapped relation with respect to the portions of said blades adjacent thereto; said orifice being provided with walls which extend transversely from said rotors to form what is substantially a rectangular tube long enough to cause substantially increased restraint to said material when discharging therethrough.

5. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said discharge orifice opening transversely from said chambers and having a depth in the axial direction of said chambers that is relatively small as compared to the overall length of said chambers and rotors, and having a width that is substantially greater than its depth, said orifice being located centrally across the junctions of said chambers and at least mainly in overlapped relation with respect to the portions of said blades adjacent thereto, said orifice being provided with walls which extend transversely from said rotors to form what is substantially a rectangular tube long enough to cause substantially increased restraint to said material when discharging therethrough; and means for varying the interspacing of two of said walls to vary said restraint.

6. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said discharge orifice opening transversely from said chambers and having a depth in the axial direction of said chambers that is relatively small as compared to the overall length of said chambers and rotors, and having a width that is substantially greater than its depth, said orifice being located centrally across the junctions of said chambers and at least mainly in overlapped relation with respect to the portions of said blades adjacent thereto, said orifice being provided with walls which extend transversely from said rotors to form what is substantially a rectangular tube long enough to cause substantially increased restraint to said material when discharging therethrough, means for varying the interspacing of two of said walls to vary said restraint; and heat exchanging means for said walls.

7. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, said discharge orifice opening transversely from said chambers and at least mainly in overlapped relation with respect to the portions of said blades adjacent thereto and having means for forming a passage extending therefrom and which is long enough to cause substantially increased restraint to said material when discharging therethrough; and means for varying the temperature of said passage.

8. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means; said blades each extending continuously without interruption for its entire length and forming a portion between its oppositely twisting portions which is free from twist.

9. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades in insufficient to force the material through said orifice, whereby the overall axial travel of said material through said chambers is dependent on the rate at which it is received by the first named means; said barrel mounting slidingly releasable bearings for the rotors' ends adjacent to said orifice, said rotor rotating means including means for mounting the other ends of said rotors with the latter projecting therefrom as cantilevers, said barrel having mounting means permitting it to be moved axially from said rotors to expose the latter for servicing.

10. A continuous internal mixer comprising a barrel forming two laterally interconnecting substantially cylindrical and mutually parallel chambers having at one end a common discharge orifice, bladed rotors located in said chambers, means for receiving the material to be mixed and stuffing in under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, said barrel mounting slidingly releasable bearings for the rotors' ends adjacent to said orifice, said rotor rotating means including means for mounting the other ends of said rotors with the latter projecting therefrom as cantilevers, said barrel having mounting means permitting it to be moved axially from said rotors to expose the latter for servicing; said rotors being hollow and having quick detachable fluid connections adjacent to said bearings which separate when said barrel is moved axially to expose said rotors.

11. A continuous internal mixer comprising a barrel forming two laterally interconnecting substantially cylindrical and mutually parallel chambers having at one end a common discharge orifice, bladed rotors located in said chambers, means for receiving the material to be mixed and stuffing it under pressure into said chambers at a location spaced from said discharge orifice, means for rotating said rotors, each of said rotors having a blade with a cross section that is substantially like that of a Banbury-type blade and having a portion that twists away from its direction of rotation and a portion that twists in the opposite direction, the length and twist ratio between said oppositely twisting portions of said blade being such that when said chambers contain said material the average of the axially directed forces applied to the latter by said blades is insufficient to force the material through said orifice, whereby the overall axial travel of said material through said chambers is dependent on the rate at which it is received by the first named means, said discharge orifice opening transversely from said chambers and at least mainly in overlapped relation with respect to the portions of said blades adjacent thereto; said blades each extending continuously without interruption for its entire length and forming a straight portion extending substantially parallel to the rotor's axis and located at its end which is overlapped by said discharge orifice.

References Cited in the file of this patent
UNITED STATES PATENTS

| | | |
|---|---|---|
| 2,698,962 | Swallow | Jan. 11, 1955 |
| 2,813,301 | Underwood | Nov. 19, 1957 |
| 2,894,280 | Juve | July 14, 1959 |
| 3,070,836 | De Haven et al. | Jan. 1, 1963 |